US009947333B1

(12) United States Patent
David

(10) Patent No.: US 9,947,333 B1
(45) Date of Patent: Apr. 17, 2018

(54) VOICE INTERACTION ARCHITECTURE WITH INTELLIGENT BACKGROUND NOISE CANCELLATION

(75) Inventor: Tony David, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 729 days.

(21) Appl. No.: 13/371,294

(22) Filed: Feb. 10, 2012

(51) Int. Cl.
*G10L 21/02* (2013.01)
*G06F 17/22* (2006.01)
*G10L 21/0208* (2013.01)
*G10L 25/06* (2013.01)
*G10L 25/18* (2013.01)

(52) U.S. Cl.
CPC .......... *G10L 21/0208* (2013.01); *G10L 25/06* (2013.01); *G10L 25/18* (2013.01)

(58) Field of Classification Search
CPC ........... G10L 15/265; G10L 2015/0638; G10L 2021/02166; G06F 3/167; G06F 3/011
USPC .................................................. 704/226, 275
See application file for complete search history.

(56) References Cited

U.S. PATENT DOCUMENTS 5,267,323 A * 11/1993 Kimura .................. G08C 23/04 381/110
7,418,392 B1 8/2008 Mozer et al.
7,720,683 B1 5/2010 Vermeulen et al.
7,774,204 B2 8/2010 Mozer et al.
2005/0080625 A1* 4/2005 Bennett ............... G06F 17/3043 704/249
2006/0235701 A1* 10/2006 Cane ....................... G10L 15/26 704/275
2008/0147397 A1* 6/2008 Konig ..................... G10L 21/02 704/246
2009/0228914 A1* 9/2009 Wong ................. G06Q 30/0205 725/32
2009/0271203 A1* 10/2009 Resch ..................... G10L 17/00 704/275

(Continued)

FOREIGN PATENT DOCUMENTS

WO WO2011088053 7/2011

OTHER PUBLICATIONS

Pinhanez, "The Everywhere Displays Projector: A Device to Create Ubiquitous Graphical Interfaces", IBM Thomas Watson Research Center, Ubicomp 2001, 18 pages.

*Primary Examiner* — Daniel Washburn
*Assistant Examiner* — Timothy Nguyen
(74) *Attorney, Agent, or Firm* — Lee & Hayes, PLLC

(57) ABSTRACT

A voice interaction architecture has a hands-free, electronic voice controlled assistant that permits users to verbally request information from cloud services. The voice controlled assistant may be positioned in a room to receive voice commands from the user. The voice controlled assistant may also pick up background sources of speech, music, or other noise, such as from a television or stereo system, which may adversely impact the user's intended vocal input to the assistant. The assistant transmits the aggregated audio data (user command and background noise) over a network to the cloud services, which implements noise cancellation functionality to remove the background noise while isolating and preserving the user's command. Once isolated, the cloud serves can process and interpret the user input to perform some function, and return the response over the network to the voice controlled assistant for audible output to the user.

29 Claims, 5 Drawing Sheets

(56) References Cited

U.S. PATENT DOCUMENTS

| | | | | |
|---|---|---|---|---|
| 2009/0299752 | A1* | 12/2009 | Rodriguez | D06F 58/28 704/275 |
| 2010/0185700 | A1* | 7/2010 | Bodain | G06F 17/30734 707/803 |
| 2010/0333163 | A1* | 12/2010 | Daly | H04N 5/4403 725/133 |
| 2011/0135107 | A1* | 6/2011 | Konchitsky | H04R 1/406 381/71.11 |
| 2012/0004909 | A1* | 1/2012 | Beltman | G10L 15/20 704/233 |
| 2012/0197612 | A1* | 8/2012 | Drews | G01H 3/10 703/6 |
| 2012/0223885 | A1 | 9/2012 | Perez | |
| 2014/0254816 | A1* | 9/2014 | Kim | G10K 11/16 381/71.11 |

* cited by examiner

VOICE INTERACTION ARCHITECTURE WITH INTELLIGENT BACKGROUND NOISE CANCELLATION

BACKGROUND

Homes are becoming more wired and connected with the proliferation of computing devices such as desktops, tablets, entertainment systems, and portable communication devices. As these computing devices evolve, many different ways have been introduced to allow users to interact with computing devices, such as through mechanical devices (e.g., keyboards, mice, etc.), touch screens, motion, and gesture. Another way to interact with computing devices is through speech.

One drawback with this mode is that vocal interaction with computers can be affected by background noise. This can be particularly problematic in the home environment, where audio devices such as televisions and radios, may output verbal utterances that the computer interprets as a user input. Accordingly, there is a need for techniques to cancel vocal background noise in such voice controlled computing environments.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

An architecture in which users can request and receive information from cloud-based services through a hands-free, electronic voice controlled assistant is described in this document. The voice controlled assistant may be positioned in a room (e.g., at home, work, store, etc.) to receive user input in the form of voice interactions, such as spoken requests or a conversational dialogue. The voice input may be transmitted to a network accessible computing platform, or "cloud service", which processes and interprets the input to perform some function. Since the voice controlled assistant is located in a room, there is a chance that background sources of speech, music, or other noise, such as from a television or radio, may adversely impact the user's intended vocal input to the assistant. Accordingly, the architecture described herein is designed to intelligently remove the background noise while isolating and preserving the user's vocal input.

The architecture may be implemented in many ways. One illustrative implementation is described below in which the voice controlled assistant is placed within a room. However, the architecture may be implemented in many other contexts and situations in which background speech may adversely disrupt user voice interaction.

Illustrative Environment

Figure 1:
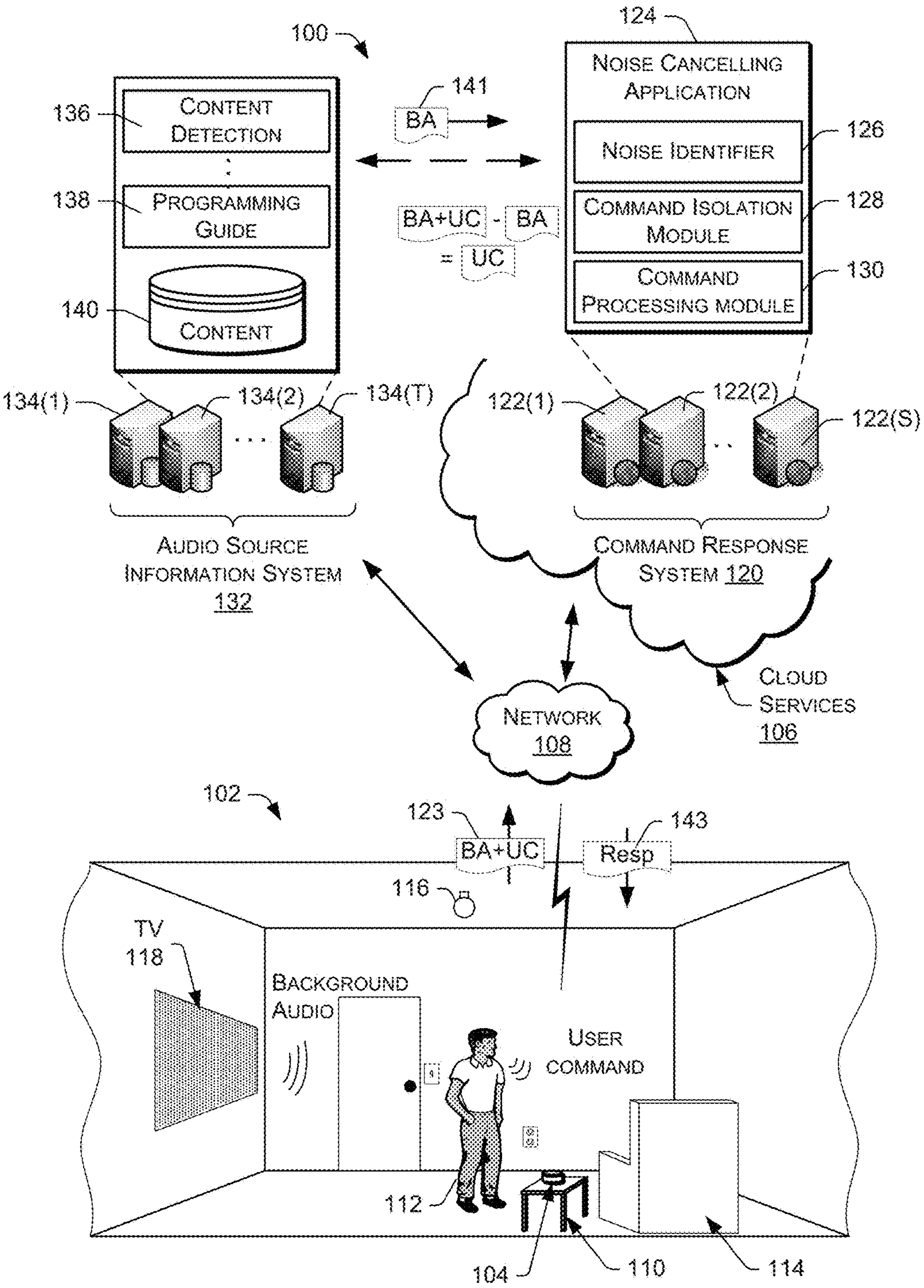
FIG. 1 shows an illustrative voice interaction computing architecture set in an exemplary home environment. The architecture includes a voice controlled assistant physically situated in the home, but communicatively coupled to remote cloud-based services accessible via a network.

FIG. 1 shows an illustrative voice interaction computing architecture 100 set in an exemplary home environment 102. The architecture 100 includes an electronic voice controlled assistant 104 physically situated in a room of the home 102, but communicatively coupled to cloud-based services 106 over a network 108. In the illustrated implementation, the voice controlled assistant 104 is positioned on a table 110 within the home 102. In other implementations, it may be placed in any number of locations (e.g., ceiling, wall, in a lamp, beneath a table, under a chair, etc.). Further, more than one assistant 104 may be positioned in a single room, or one assistant may be used to accommodate user interactions from more than one room.

Generally, the voice controlled assistant 104 has a microphone and speaker to facilitate audio interactions with a user 112. The voice controlled assistant 104 is implemented without a haptic input component (e.g., keyboard, keypad, touch screen, joystick, control buttons, etc.) or a display. In certain implementations, a limited set of one or more haptic input components may be employed (e.g., a dedicated button to initiate a configuration, power on/off, etc.). Nonetheless, the primary and potentially only mode of user interaction with the electronic assistant 104 is through voice input and audible output. One example implementation of the voice controlled assistant 104 is provided below in more detail with reference to FIG. 2.

The microphone of the voice controlled assistant 104 detects words and sounds uttered from the user 112. The user may speak predefined commands (e.g., "Awake"; "Sleep"), or use a more casual conversation style when interacting with the assistant 104 (e.g., "I'd like to go to a movie. Please tell me what's playing at the local cinema."). The voice controlled assistant receives the user's vocal input, and transmits it over the network 108 to the cloud services 106. The vocal input is interpreted to form an operational request or command, which is then processed at the cloud services 106. The requests may be for essentially type of operation that can be performed by cloud services, such as database inquires, requesting and consuming entertainment (e.g., gaming, finding and playing music, movies or other content, etc.), personal management (e.g., calendaring, note taking, etc.), online shopping, financial transactions, and so forth.

In FIG. 1, the user 112 is shown in a room of the home 102. The room is defined by walls, floor, and ceiling. In addition to the table 110, the room may have other pieces of furniture (e.g., chair 114), one or more fixtures (e.g., light 116), and one or more electronics devices, such as a television 118. The ambient conditions of the room may introduce other audio signals that form background noise for the voice controlled assistant 104. Of particular interest, the television 118 emits background audio that includes voices, music, special effects soundtracks, and the like that may obscure the voice commands being spoken by the user 112.

The voice controlled assistant 104 may be communicatively coupled to the network 108 via wired technologies (e.g., wires, USB, fiber optic cable, etc.), wireless technologies (e.g., RF, cellular, satellite, Bluetooth, etc.), or other connection technologies. The network 108 is representative of any type of communication network, including data and/or voice network, and may be implemented using wired infrastructure (e.g., cable, CATS, fiber optic cable, etc.), a wireless infrastructure (e.g., RF, cellular, microwave, satellite, Bluetooth, etc.), and/or other connection technologies. The network 108 carries data, such as audio data, between the cloud services 106 and the voice controlled assistant 104.

The cloud services 106 generally refer to a network accessible platform implemented as a computing infrastructure of processors, storage, software, data access, and so forth that is maintained and accessible via a network such as the Internet. Cloud services 106 do not require end-user knowledge of the physical location and configuration of the system that delivers the services. Common expressions associated with cloud services include "on-demand computing", "software as a service (SaaS)", "platform computing", "network accessible platform", and so forth.

The cloud services 106 include a command response system 120 that is implemented by one or more servers, such as servers 122(1), 122(2), . . . , 122(S). The servers 122(1)-(S) may host any number of applications that can process the user input received from the voice controlled assistant 104, and produce a suitable response. These servers 122(1)-(S) may be arranged in any number of ways, such as server farms, stacks, and the like that are commonly used in data centers. One example implementation of the command response system 120 is described below in more detail with reference to FIG. 3.

As noted above, because the voice controlled assistant 104 is located in a room, other ambient noise may be introduced into the environment that is unintended for detection by the assistant 104. The background noise may be human voices, singing, music, movie sound tracks, gaming sound effects, and the like. In the FIG. 1 illustration, one common source of background noise is the TV 118. Background noise introduced by the TV 118 is particularly problematic because the noise includes spoken words from characters that may be picked up by the voice controlled assistant 104. In addition to TV, other devices (e.g., radio, DVC player, computer, etc.) may emit voice or other human sounds, music, sound tracks, game sound effects, and other sounds that might potentially interfere with the user's interaction with the assistant 104.

The voice controlled assistant 104 captures both the user command and the background noise. As the assistant is intentionally designed with limited functionality to keep costs low, there may be limited or no noise canceling capabilities implemented on the assistant 104. Instead, the aggregated audio data that includes the user command and background noise are transmitted over the network 108 to the cloud services 106. This is represented in FIG. 1 by a data packet 123 containing background audio (BA) and the user command (UC).

The command response system 120 in the cloud services 106 hosts an intelligent noise canceling application 124 to reduce or eliminate the background audio from the aggregated audio data to restore the user command as the primary input, and then process the user command. In the illustrated implementation, the noise canceling application 124 includes a noise identifier 126 to identify background noises in the aggregated audio data received from the assistant 104, a command isolation module 128 to filter out the noises to isolate the user command, and a command processing module 130 to process the user command to generate an appropriate response.

The noise identifier 126 is configured to ascertain content of the background noise contained in the aggregated audio data received from the voice controlled assistant 104. There are many ways for the noise identifier 126 to make this determination. In one implementation, the noise identifier 126 listens to the aggregated audio data and attempts to identify a signature of the background noise. The command response system 120 may maintain a library of sounds that is have been previously identified and recorded from the user's home 102 and evaluates the current background noise relative to that collection.

In another implementation, the noise identifier 126 may conduct searches at other resource systems accessible on the Internet. In FIG. 1, an audio source information system 132 is illustrated as a separate online resource for identifying audio sounds. The system 132 may be implemented as a website accessible over the Internet or a private resource accessible by a private network, or over a public network using secure access credentials. The audio source information system 132 has one or more servers 134(1), 134(2), . . . , 134(T) that host various applications that may be used to determine the source of human dialogue, music, games, sound effects, and other sounds. Two example applications are illustrated, including a content detection module 136 and an electronic programming guide (EPG) 138. These applications may reside on a common system 132 or on entirely separate and independent systems.

In one scenario, the noise identifier 126 may conduct a web search for an audio signature of a background sound by sending a query to the audio source information system 132. The content detection application 136, executing on the servers 134(1)-(T), may analyze the background sound and attempt to identify a match. As one example, when attempting to identify background music, the application 136 may be implemented as a music identification application, such as Shazam™, that identifies the song, track, and/or artist.

In another scenario, the noise identifier 126 may ascertain which station or program channel is playing on the user's TV 118. The identifier 126 may query the user's media system (if accessible) or analyze the noise and attempt to find programming that matches. The identifier 126 may also access the electronic programming guide (EPG) 138 available online at the audio source information system 132 to find a matching program at the appropriate time slot.

In any one of these scenarios and examples, once the content is identified, that content or source feed of the content is retrieved locally or from a remote site, such as content store 140 at system 132. More specifically, the identified content may be retrieved from a store or a source of the content (such as live news feed or streaming programming content). The content matching the background noise is returned to the noise cancelling application 124 as represented by packet 141 containing the background audio (BA).

The content is provided to the command isolation module 128 of the noise cancellation application 124. The command isolation module 128 implements an adaptive noise cancellation algorithm to eliminate or otherwise reduce that part of the noise from the aggregated audio data received from the voice controlled assistant 104. The adaptive noise cancellation algorithm subtracts the content from the aggregated data to return a clearer audio that primarily features the user command. This is represented by the subtraction of the background audio (BA) from the aggregate audio (BA+UC) to return the user command audio (UC).

The command processing module 130 receives the user command (UC) extracted from the processed audio data by the command isolation module 128, and processes the user command data. The user command data may be in any number of forms. For instance, it may be a simple word or phrase that is matched to a set of pre-defined words and phrases to find a corresponding action or operation to be executed. In other implementations, the user command data may be a conversational dialogue. The command processing module 130 may employ a natural language processing engine to interpret the statements and act on those statements.

The operations associated with the user input may be essentially any activity that can be carried out by a computerized system. For instance, the user may request a search (e.g., "what is playing at the local cinema?"), or engage in online shopping (e.g., "how much are a pair of size 6 leather boots?"), or conduct a financial transaction (e.g., "please move $100 to my checking account"). In the first instance, the command processing module 130 may query a website of a local cinema or a more general entertainment website for a listing of shows and times. In the second scenario, the command processing module 130 may query one or more online retailer sites to identify leather boots and associated prices. In the last scenario, the command processing module 130 may interact with the user's financial institution to transfer funds (e.g., $100) from a savings account to a checking account.

Once an operation is performed, the command processing module 130 formulates a response. The response is formatted as audio data that is returned to the voice controlled assistant 104 over the network 108. This response is represented by a packet 143. When received, the voice controlled assistant 104 audibly plays the response for the user. Using the above examples, the assistant 104 may output statements like, "The Sound of Music is playing today at 4:00 pm and 7:30 pm"; or "A pair of light brown leather boots by Frye is available for $175. Do you want to purchase?"; or "To make this transfer, please tell me your date of birth and the last four digits of your account."

Illustrative Voice Controlled Assistant

Figure 2:
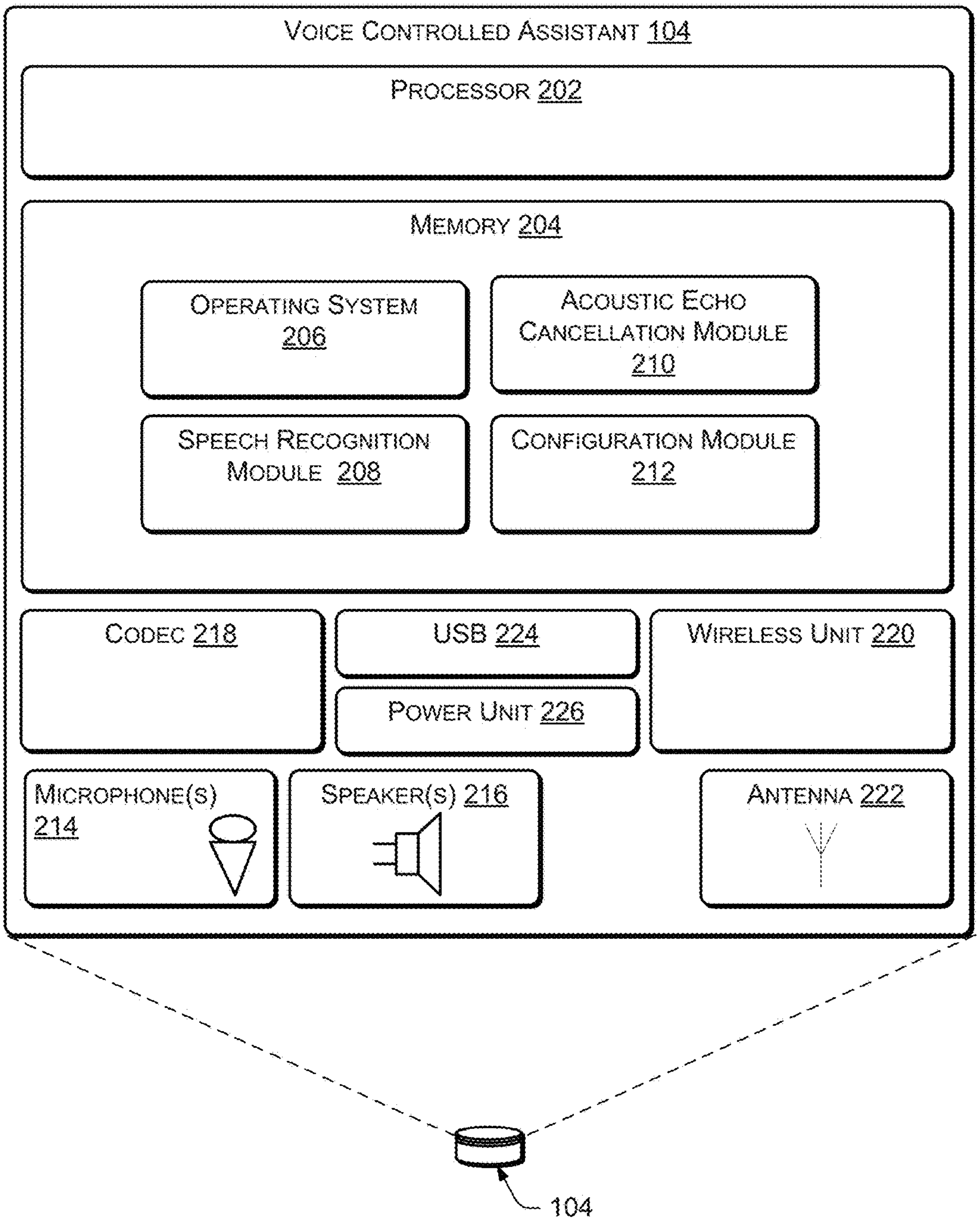
FIG. 2 shows a block diagram of selected functional components implemented in the voice controlled assistant of FIG. 1.

FIG. 2 shows selected functional components of the voice controlled assistant 104 in more detail. Generally, the voice controlled assistant 104 may be implemented as a standalone device that is relatively simple in terms of functional capabilities with limited input/output components, memory and processing capabilities. For instance, the voice controlled assistant 104 does not have a keyboard, keypad, or other form of mechanical input. Nor does it have a display or touch screen to facilitate visual presentation and user touch input. Instead, the assistant 104 may be implemented with the ability to receive and output audio, a network interface (wireless or wire-based), power, and limited processing/memory capabilities.

In the illustrated implementation, the voice controlled assistant 104 includes a processor 202 and memory 204. The memory 204 may include computer-readable storage media ("CRSM"), which may be any available physical media accessible by the processor 202 to execute instructions stored on the memory. In one basic implementation, CRSM may include random access memory ("RAM") and Flash memory. In other implementations, CRSM may include, but is not limited to, read-only memory ("ROM"), electrically erasable programmable read-only memory ("EEPROM"), or any other medium which can be used to store the desired information and which can be accessed by the processor 202.

Several modules such as instruction, datastores, and so forth may be stored within the memory 204 and configured to execute on the processor 202. An operating system module 206 is configured to manage hardware and services (e.g., wireless unit, USB, Codec) within and coupled to the assistant 104 for the benefit of other modules. A speech recognition module 208 and an acoustic echo cancellation module 210 provide some basic speech recognition functionality. In some implementations, this functionality may be limited to specific commands that perform fundamental tasks like waking up the device, configuring the device, cancelling an input, and the like. The amount of speech recognition capabilities implemented on the assistant 104 is an implementation detail, but the architecture described herein supports having some speech recognition at the local assistant 104 together with more expansive speech recognition at the cloud services 106. A configuration module 212 may also be provided to assist in an automated initial configuration of the assistant (e.g., find wifi connection, enter key, etc.) to enhance the user's out-of-box experience, as well as reconfigure the device at any time in the future.

The voice controlled assistant 104 includes one or more microphones 214 to receive audio input, such as user voice input, and one or more speakers 216 to output audio sounds. A codec 218 is coupled to the microphone 214 and speaker 216 to encode and/or decode the audio signals. The codec may convert audio data between analog and digital formats. A user may interact with the assistant 104 by speaking to it, and the microphone 214 captures the user speech. The codec 218 encodes the user speech and transfers that audio data to other components. The assistant 104 can communicate back to the user by emitting audible statements through the speaker 216. In this manner, the user interacts with the voice controlled assistant simply through speech, without use of a keyboard or display common to other types of devices.

The voice controlled assistant 104 includes a wireless unit 220 coupled to an antenna 222 to facilitate a wireless connection to a network. The wireless unit 214 may implement one or more of various wireless technologies, such as wifi, Bluetooth, RF, and so on.

A USB port 224 may further be provided as part of the assistant 104 to facilitate a wired connection to a network, or a plug-in network device that communicates with other wireless networks. In addition to the USB port 224, or as an alternative thereto, other forms of wired connections may be employed, such as a broadband connection. A power unit 226 is further provided to distribute power to the various components on the assistant 104.

The voice controlled assistant 104 is designed to support audio interactions with the user, in the form of receiving voice commands (e.g., words, phrase, sentences, etc.) from the user and outputting audible feedback to the user. Accordingly, in the illustrated implementation, there are no haptic input devices, such as navigation buttons, keypads, joysticks, keyboards, touch screens, and the like. Further there is no display for text or graphical output. In one implementation, the voice controlled assistant 104 may include non-input control mechanisms, such as basic volume control button(s) for increasing/decreasing volume, as well as power and reset buttons. There may also be a simple light element (e.g., LED) to indicate a state such as, for example, when power is on. But, otherwise, the assistant 104 does not use or need to use any input devices or displays.

Accordingly, the assistant 104 may be implemented as an aesthetically appealing device with smooth and rounded surfaces, with some apertures for passage of sound waves, and merely having a power cord and optionally a wired interface (e.g., broadband, USB, etc.). Once plugged in, the device may automatically self-configure, or with slight aid of the user, and be ready to use. As a result, the assistant 104 may be generally produced at a low cost. In other implementations, other I/O components may be added to this basic model, such as specialty buttons, a keypad, display, and the like.

Illustrative Cloud Services

Figure 3:
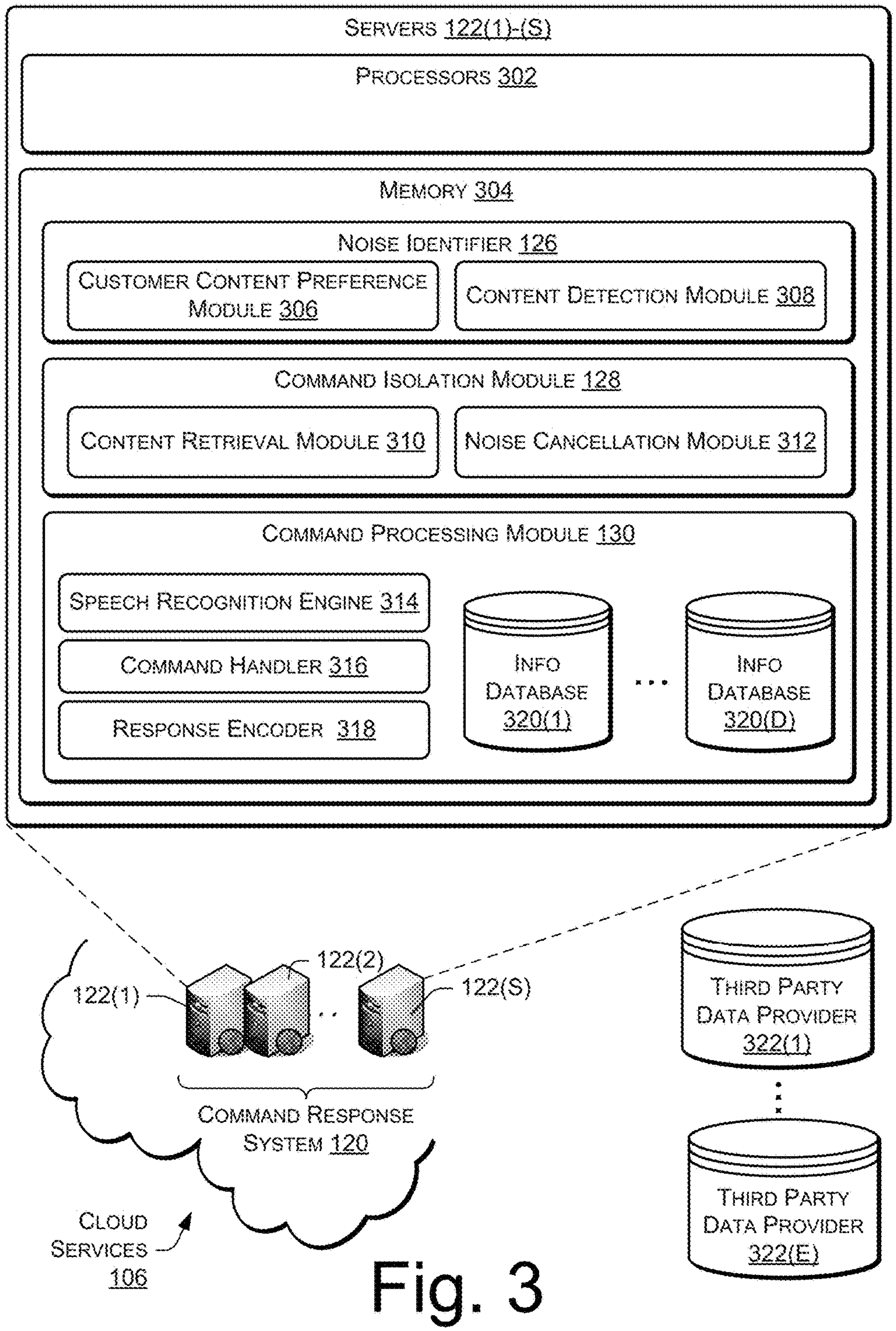
FIG. 3 shows a block diagram of a server architecture implemented as part of the cloud-based services of FIG. 1.

FIG. 3 shows selected functional components of a server architecture implemented by the command response system 120 as part of the cloud services 106 of FIG. 1. The command response system 120 includes one or more servers, as represented by servers 122(1)-(S). The servers collectively comprise processing resources, as represented by processors 302, and memory 306. The memory 306 may include volatile and nonvolatile memory, removable and non-removable media implemented in any method or technology for storage of information, such as computer-readable instructions, data structures, program modules, or other data. Such memory includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, RAID storage systems, or any other medium which can be used to store the desired information and which can be accessed by a computing device.

In the illustrated implementation, the noise identifier 126, command isolation module 128, and command processing module 130 are shown as software components or computer-executable instructions stored in the memory 304 and executed by one or more processors 302. The noise identifier 126 receives the aggregated audio data from the voice controlled assistant 104 and identifies the noise included in the audio data that is not attributable to the user. The noise identifier 126 may try to analyze the noise locally, and attempt to identify the content and source. The noise identifier 126 may alternatively query other resources on the web to attempt to identify the content and source associated with the background noise.

In FIG. 3, the noise identifier 126 is shown implemented with a customer content preference module 306 and a content detection module 308. The customer content preference module 306 maintains a list of content preferences for the user. The list may identify content providers from which the user may receive content (e.g., a cable provider, streaming content sources, etc.), favorite websites, music, movies, games, and so on. These preferences may be entered by the user through a wizard or UI, or may be intelligently gathered over time by monitoring the user behavior including patterns in shopping, browsing, viewing, and listening. In one usage scenario, the noise identifier 126 may use the content retrieval module 306 to scan through the list in an effort to find content matching the background noise received as part of the aggregated audio data. For instance, the preference module 306 may scan the cable guide of the user's cable provider for shows at the current time slot, or may search favored music or gaming sites to see if any of these may source the content present in the background noise.

The content detection module 308 analyzes the audio data received from the voice controlled assistant 104 and attempts to isolate the background noise segment. From this segment, the content detection module 308 extracts a unique signature that uniquely identifies the background content. The signature may then be compared to content signatures associated with content items. These content signatures may be stored locally or remotely. When a relevant content signature is found, the associated content item is identified as part of the background noise.

Once the identity of the noise content is ascertained, the command isolation module 128 retrieves the content for use in canceling the background noise from the aggregated audio data. The command isolation module 128 is shown as including a content retrieval module 310 and a noise cancellation module 312. The content retrieval module 310 retrieves the content identified by the identifier 126 as that present in the background noise in the aggregated audio data. The module 310 may access content stored locally, or query a remote site for the content. Once the content is retrieved, the noise cancellation module 312 uses the content to at least partially remove the same content from the background noise, thereby leaving the user command data. In one implementation, the noise cancellation module 312 syncs the retrieved content with the background noise component and employs an adaptive noise cancellation algorithm that effectively subtracts the identified and retrieved content from the aggregated audio data. The operation removes the background noise and thus isolates the user command.

The command processing module 130 processes the newly isolated user command. This may be done in any number of ways. In the illustrated implementation, the command processing module 130 includes an optional speech recognition engine 314, a command handler 316, and a response encoder 318. The speech recognition engine 314 converts the user command to a text string. In this text form, the user command can be used in search queries, or to reference associated responses, or to direct an operation, or to be processed further using natural language processing techniques, or so forth. In other implementations, the user command may be maintained in audio form, or be interpreted into other data forms.

The user command is passed to a command handler 316 in its raw or a converted form, and the handler 316 performs essentially any operation that might use the user command as an input. As one example, a text form of the user command may be used as a search query to search one or more databases, such as internal information databases 320 (1), . . . , 320(D) or external third part data providers 322(1), . . . , 322(E). Alternatively, an audio command may be compared to a command database (e.g., one or more information databases 320(1)-(D)) to determine whether it matches a pre-defined command. If so, the associated action or response may be retrieved. In yet another example, the handler 316 may use a converted text version of the user command as an input to a third party provider (e.g., providers 322(1)-(E)) for conducting an operation, such as a financial transaction, an online commerce transaction, and the like.

Any one of these many varied operations may produce a response. When a response is produced, the response encoder 318 encodes the response for transmission back over the network 108 to the voice controlled assistant 104. In some implementations, this may involve converting the response to audio data that can be played at the assistant 104 for audible output through the speaker to the user.

Illustrative Process

Figure 4:
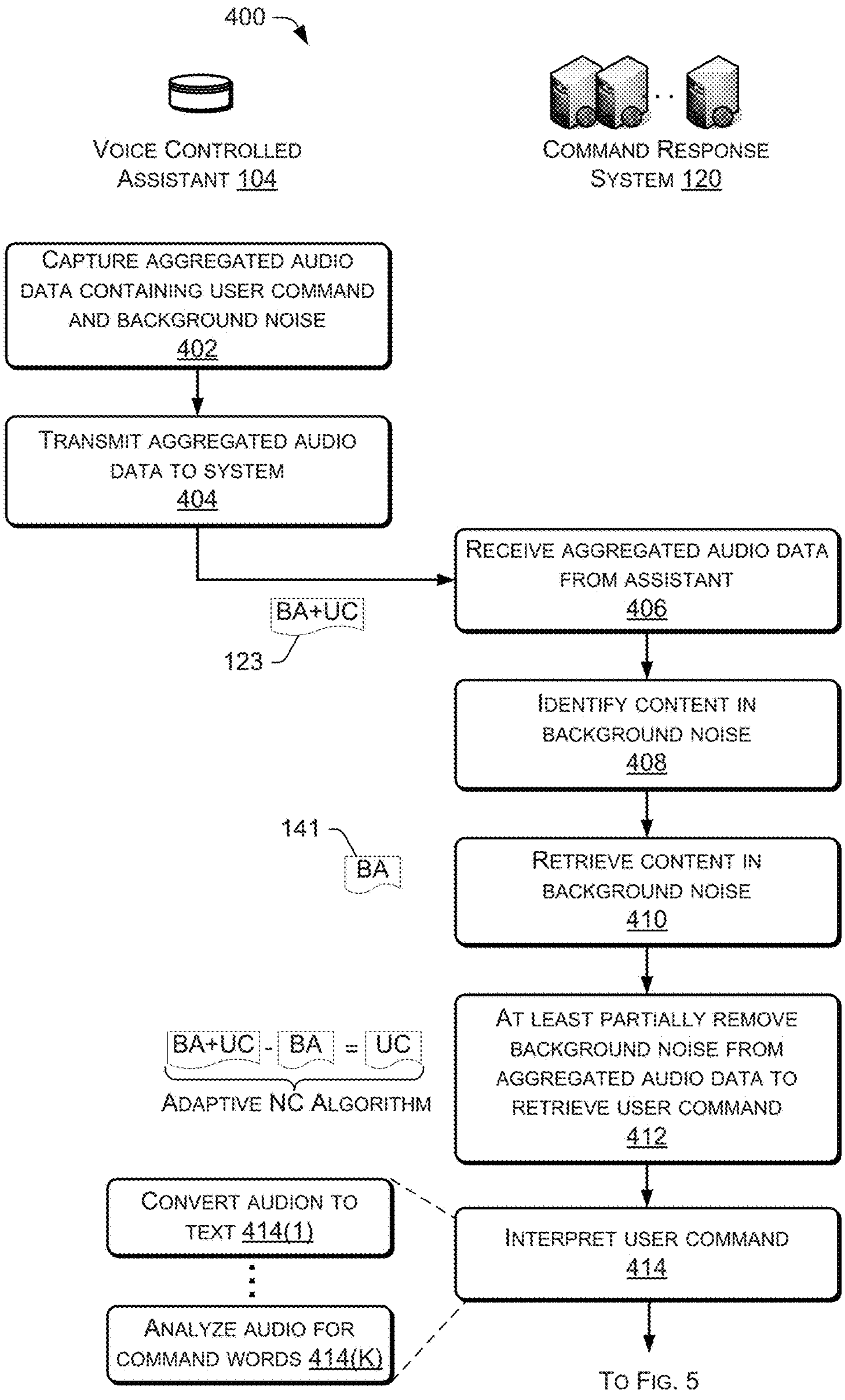
FIGS. 4 and 5 present a flow diagram showing an illustrative process of cancelling background noise from voice interactions spoken by a user to the voice controlled assistant in the home environment.
Figure 5:
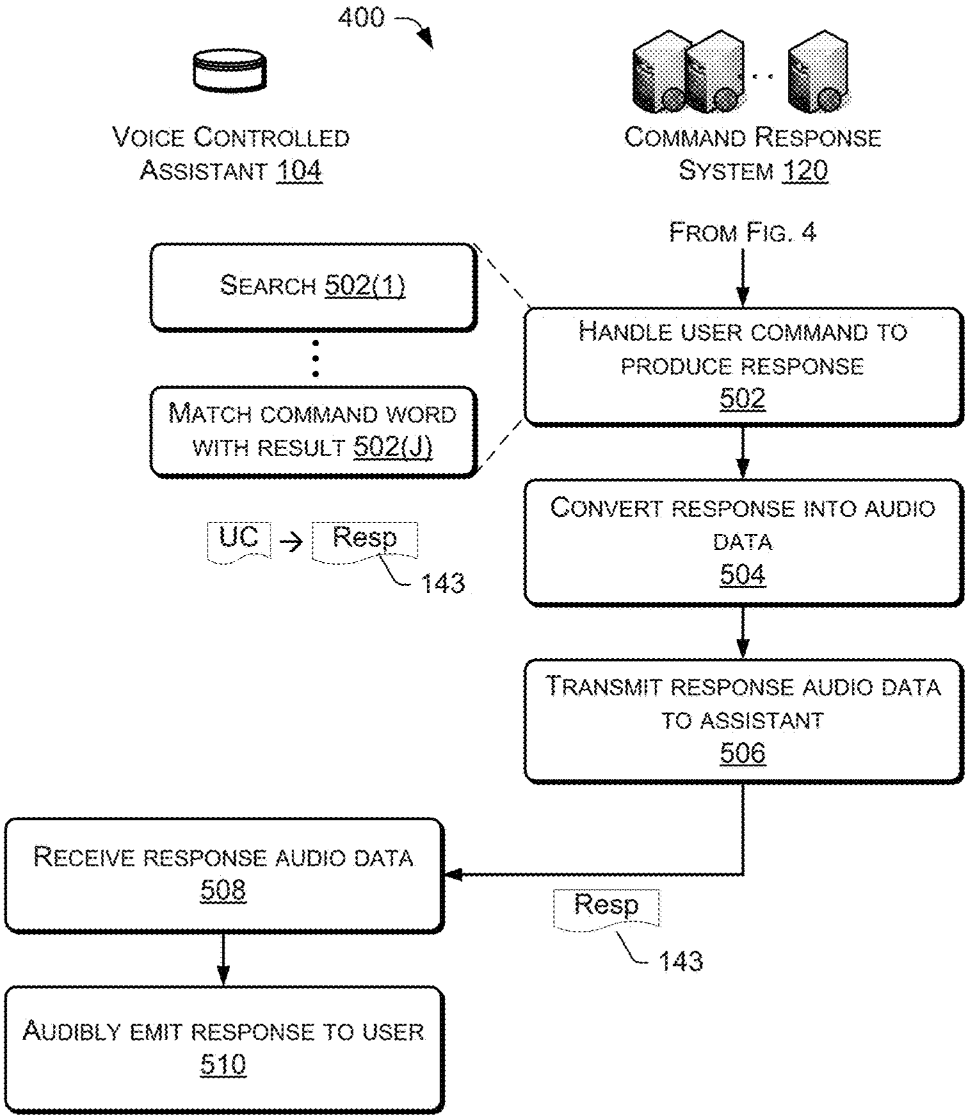

FIGS. 4 and 5 show an illustrative process 400 of cancelling background noise from voice interactions spoken by a user to a voice controlled assistant 104. The processes may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented with other architectures as well.

For purposes of describing one example implementation, the blocks are arranged visually in FIGS. 4 and 5 in columns beneath a voice controlled assistant 104 and the command response system 120 to illustrate what parts of the architecture may perform these operations. That is, actions defined by blocks arranged beneath the voice controlled assistant may be performed by the assistant, and similarly, actions defined by blocks arranged beneath the command response system may be performed by the system.

At 402, the voice controlled assistant 104 captures aggregated audio data containing a user command and background noise. The user command may be a single word, phrase, or conversational-style sentence. The background noise may arise from any number of sources. Of particular interest are background noises emanating from content playing devices, such as televisions, radios, stereo systems, DVD players, game consoles, and the like.

At 404, the aggregated audio data 123 captured by the assistant 104 is transmitted over the network 108 to the command response system 120 in the cloud services 106. At 406, the command response system 120 receives the aggregated audio data from the voice controlled assistant 104.

At 408, the command response system 120 identifies content forming at least part of the background noise of the aggregated audio data. There are several ways to identify content. In one approach, the system 120 may employ a content detection module 308 to analyze the audio data, perhaps extracting a unique signature, and attempting to match the noise portions with existing content or signatures. In another approach, the system 120 examines possible sources of background content that the user may be consuming as part of his/her regular habits, such as patterns in viewing TV programming, or listening to favorite music, or playing a particular collection of video games. In still another approach, the system 120 may query other services, such as audio source information system 132 in FIG. 1, to help identify a potential source of, or content in, the background noise. These third party services may provide, for example, an electronic programming guide (e.g., EPG 138 in FIG. 1) having a schedule of programming that the user may be consuming at a particular time. Alternatively, the third party services may implement content detection component (e.g., module 136 in FIG. 1) or to listen to the aggregate audio and attempt to identify portions of the audio through an audio matching algorithm.

At 410, the content identified as forming at least part of the background noise is retrieved. The command response system 120 may store content locally, and simply retrieve that content. Alternatively, the content may be available from another provider, and the system 120 queries that provider for the content.

At 412, the retrieved content is used to at least partially remove the background noise from the aggregated audio data. In one approach, an adaptive noise cancellation algorithm may be applied to subtract the retrieved content from the aggregated audio data, there by canceling or reducing the background noise. This process leaves the user command in a clearer and more understandable state.

At 414, the newly isolated user command is interpreted. This may be accomplished in many ways, as represented by sub-operations 414(1), . . . , 414(K). As examples of potential approaches to interpret the user command, at 414(1), the user command may be converted form audio to text for processing. A speech recognition engine may be used to make this conversion. Alternatively, at 414(K), the post-cancellation audio data may be analyzed to extract predefined command words.

With continuing reference to the process 400 in FIG. 5, at 502, the command response system 120 handles the user command to produce a response 143. The user command may be processed in many different ways, as represented by the handling sub-operations 502(1), . . . , 502(J). At 502(1), for example, a text version of the user command may be analyzed using natural language processing techniques and/or inserted into a search query to produce a response in the form of a results set from the query. At 502(J), the user command may be used as input to a command-response database that associates commands with corresponding responses. However, there are many other possible functions that may be performed using the isolated voice command, such as initiating or conducting a transaction (financial, business, etc.) through an automated, online transaction system. Another example is to use the voice commend in conducting online commerce, such as shopping for an item, viewing the price, selecting the item for purchase, and going through a checkout process. Still another example might include requesting delivery of entertainment content, such as verbally requesting a particular movie or song, and controlling its playback and shuttle operations.

At 504, the response may be converted into audio data. For instance, a response from a database search may be converted into an audible presentation of the results set. As another example, a user command seeking a price of an e-commerce item may produce a response, that when converted into audio, audibly describes the e-commerce item and associated pricing.

At 506, the response audio data 143 is transmitted back from the command response system 120 to the voice controlled assistant 104. At 508, the response audio data is received from the network at the voice controlled assistant 104.

At 510, the assistant 104 audibly emits the response audio data through the speaker to the user. In this manner, the user is provided with audio feedback from the original user command. Depending on network speeds and the type of operation requested, the time lapse between entry of the user command and output of the response may range on average from near instantaneous to a few seconds.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:

a voice controlled assistant having a microphone to receive voice input and background noise;

the voice controlled assistant further having a network interface to transmit aggregated audio data representing the voice input and the background noise over a network;

a command response system remote from the voice controlled assistant and communicatively coupled to the voice controlled assistant to receive the aggregated audio data from the voice controlled assistant via the network, the command response system configured to:

identify a source of the background noise at least by:

identifying first audio content from the background noise;

sending a request to a remote server for second audio content that is associated with the first audio content; and receiving the second audio content from the remote server;

remove, using the second audio content, at least a part of the background noise from the aggregated audio data;

identify the voice input;

produce an audio response for the voice controlled assistant, the audio response representative of a speech;

send the audio response over the network to the voice controlled assistant; and the voice controlled assistant being configured to receive the audio response and to audibly emit the audio response representative of the speech through a speaker.

2. The system of claim 1, wherein the background noise includes content from a television.

3. The system of claim 1, wherein the command response system comprises:

one or more processors;

memory accessible by the one or more processors;

one or more computer-executable instructions stored in the memory and executable on the one or more processors to at least partially remove the background noise using an adaptive noise cancellation algorithm.

4. The system of claim 1, wherein the command response system comprises:

one or more processors;

memory accessible by the one or more processors; and a noise source identifier stored in the memory and executable on the one or more processors to identify a source of the background noise.

5. The system of claim 1, wherein the operation performed by the command response system comprises one or more of:

forming a search query to include information from the voice input;

performing a look-up for a response associated with the voice input;

initiating a transaction using the voice input;

conducting online commerce; or requesting delivery of entertainment content.

6. The system of claim 1, wherein the command response system comprises a natural language processing engine to interpret the voice input prior to performing the operation.

7. The system of claim 1, wherein the command response system is implemented as a network accessible platform that is accessible by the voice controlled assistant over the network.

8. The system of claim 1, wherein the identifying the source of the background noise further comprises determining that the first audio content from the background noise corresponds to stored audio associated with a previously identified source of a previous background noise, the stored audio being stored at the remote server.

9. A system comprising:

a network accessible infrastructure of one or more processors and memory accessible by the one or more processors, the network accessible infrastructure residing at a data center location and being configured to receive over a network aggregated audio data from a first device that is at a user-based location distant and separate from the data center location;

one or more computer-executable instructions stored in the memory and executable on the one or more processors to:

receive the aggregated audio data from the first device, the aggregated audio data representing a voice command from a user and background noise from an environment surrounding the user, the background noise comprising audio data representing speech produced from a second device that is at the user-based location;

identify content in the background noise contained in the aggregated audio data by accessing content preferences previously associated with a profile of for the user and compare a portion of audio associated with the content preferences to the background noise;

at least partially remove the background noise from the aggregated audio data using the content; and process the voice command extracted from the aggregated audio data after the background noise has been at least partially removed; and a response encoder to generate a response for the first device.

10. The system of claim 9, wherein the background noise includes additional content from the second device.

11. The system of claim 9, wherein the one or more computer-executable instructions are further executable on the one or more processors to maintain the content preferences for the user, the content preferences comprising at least one of television viewing patterns of the user, most frequently viewed television programs, most frequently played music, or most frequently played video games.

12. The system of claim 9, wherein the one or more computer-executable instructions are further executable on the one or more processors to analyze the background noise from the aggregated audio data and discern a signature of the background noise to be used to identify the content of the background noise.

13. The system of claim 9, wherein the one or more computer-executable instructions are further executable on the one or more processors to retrieve the content.

14. The system of claim 9, wherein the one or more computer-executable instructions are further executable by the one or more processors to apply an adaptive noise cancellation algorithm to at least partially remove the background noise from the aggregated audio data.

15. The system of claim 9, wherein the one or more computer-executable instructions are further executable by the one or more processors to convert the voice command from audio to text data.

16. The system of claim 9, wherein the one or more computer-executable instructions are further executable by the one or more processors to:

form a search query to include information from the voice command;

perform a look-up for a response associated with the voice command;

initiate a transaction using the voice command;
conduct online commerce; or
request delivery of entertainment content.

17. The system of claim 9, wherein the response encoder is stored in the memory.

18. One or more non-transitory computer readable media storing instructions that, when executed on one or more processors, performs acts comprising:

receiving aggregated audio data from a first device, the aggregated audio data containing an audio command from a user and background noise having content emitted from a second device, the background noise comprising audio data representing speech produced from the second device;

analyzing content preferences associated with a user account of the user with the content emitted from the second device, the content preference including at least one of television viewing habits of the user or frequently viewed television programs associated with the user;

identifying the content emitted from the second device based at least in part on the content preferences;

at least partially removing the content emitted from the second device from the aggregated audio data to capture the audio command;

processing the audio command to generate a response representative of speech; and sending the response back to the first device.

19. The one or more non-transitory computer readable media of claim 18, wherein transmitting the response comprises transmitting a response that is to be emitted in audible form to the user.

20. The one or more non-transitory computer readable media of claim 18, wherein identifying the content from the second device further comprises searching an electronic programming guide for a source of the content.

21. The one or more non-transitory computer readable media of claim 18, wherein identifying the content from the second device further comprises deriving a signature from the content and using the signature to identify the content.

22. The one or more non-transitory computer readable media of claim 18, wherein at least partially removing the content from the aggregated audio data comprises applying an adaptive noise cancellation algorithm.

23. The one or more non-transitory computer readable media of claim 18, wherein processing the audio command comprises at least one of:

forming a search query to include information from the audio command;

performing a look-up for a response associated with the audio command;

initiating a transaction using the audio command;

conducting online commerce; or requesting delivery of entertainment content.

24. A method comprising:

capturing, by a client device at a first location, aggregated audio data representing an audio command from a user and ambient background noise;

transmitting the aggregated audio data from the first location to a second location;

identifying, at the second location by a computing system, content contributing to the ambient background noise represented in the aggregated audio data at least by:

identifying first audio content from the ambient background noise;

sending a request to a remote server for second audio content that is associated with the first audio content; and receiving the second audio content from the remote server;

at least partially removing, by the computing system, the ambient background noise from the aggregated audio data using the second audio content;

processing, by the computing system, the audio command to generate a response representative of speech;

sending the response from the second location back to the first location; and emitting the response in audible form to the user.

25. The method of claim 24, wherein identifying the content further comprises deriving a signature from the content and using the signature to identify the content.

26. The method of claim 24, wherein identifying the content further comprises searching remote systems at a third location to determine a match to the content.

27. The method of claim 24, wherein removing the background noise comprises applying an adaptive noise cancellation algorithm.

28. The method of claim 24, wherein processing the audio command comprises at least one of:

forming a search query to include information from the audio command;

performing a look-up for a response associated with the audio command;

initiating a transaction using the audio command;

conducting online commerce; or requesting delivery of entertainment content.

29. The method of claim 24, wherein the content comprises television programming, and identifying the content further comprises searching an electronic programming guide for a source of the content and retrieving the content from one of the source or another location.

* * * * *